No. 668,736. Patented Feb. 26, 1901.
T. A. KILLMAN.
BALING PRESS.
(Application filed May 7, 1900.)
(No Model.) 9 Sheets—Sheet 2.
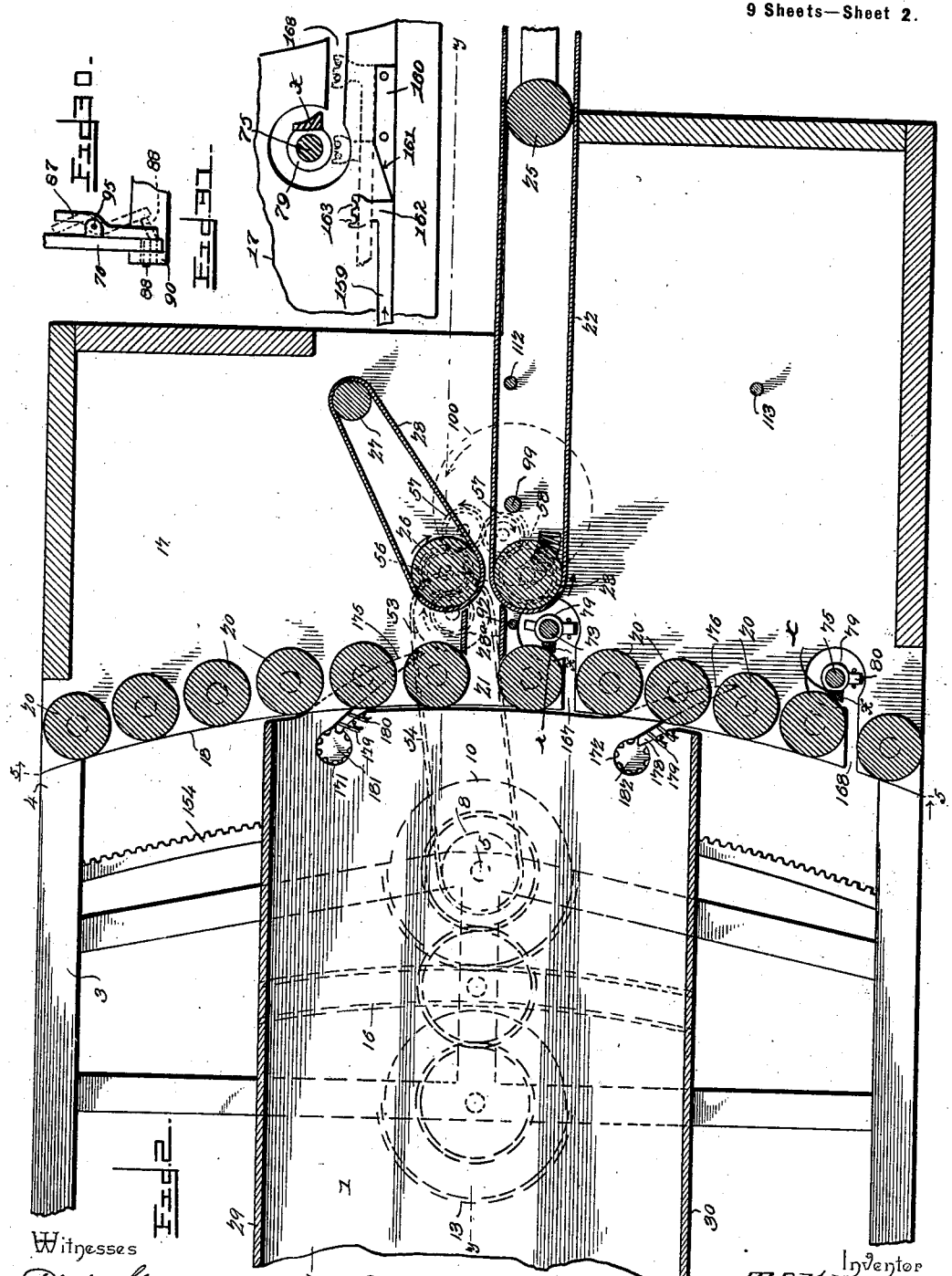

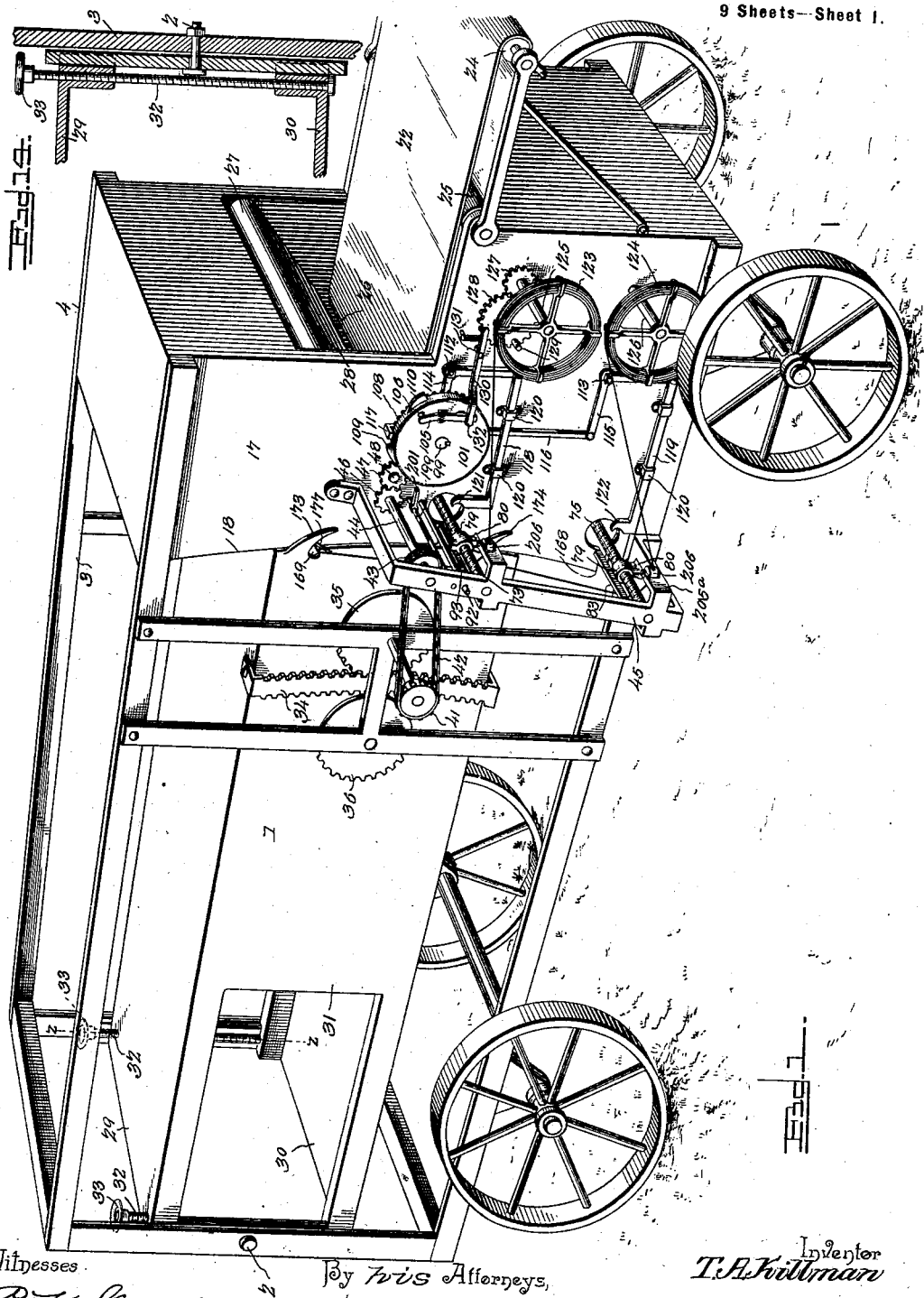

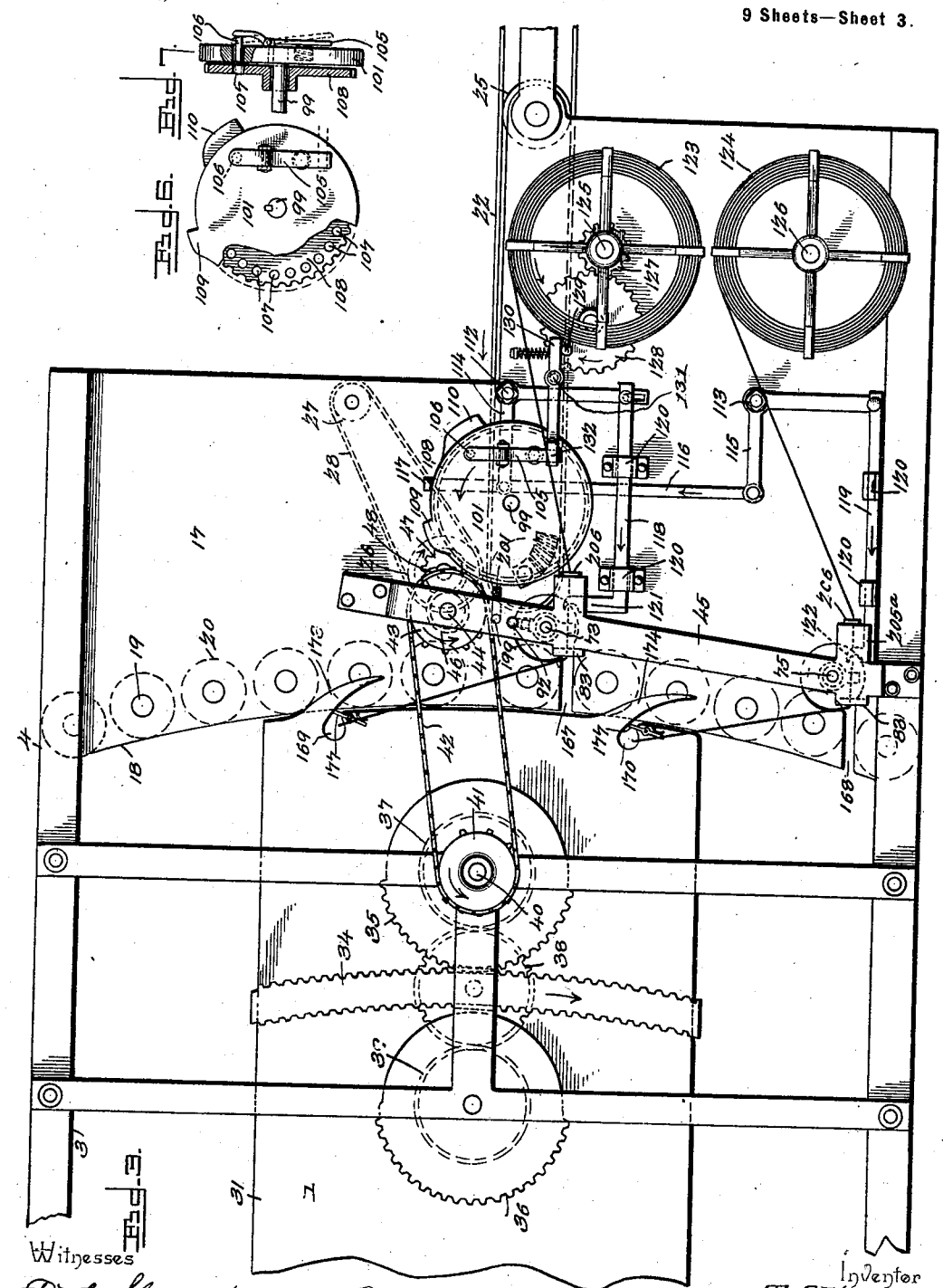

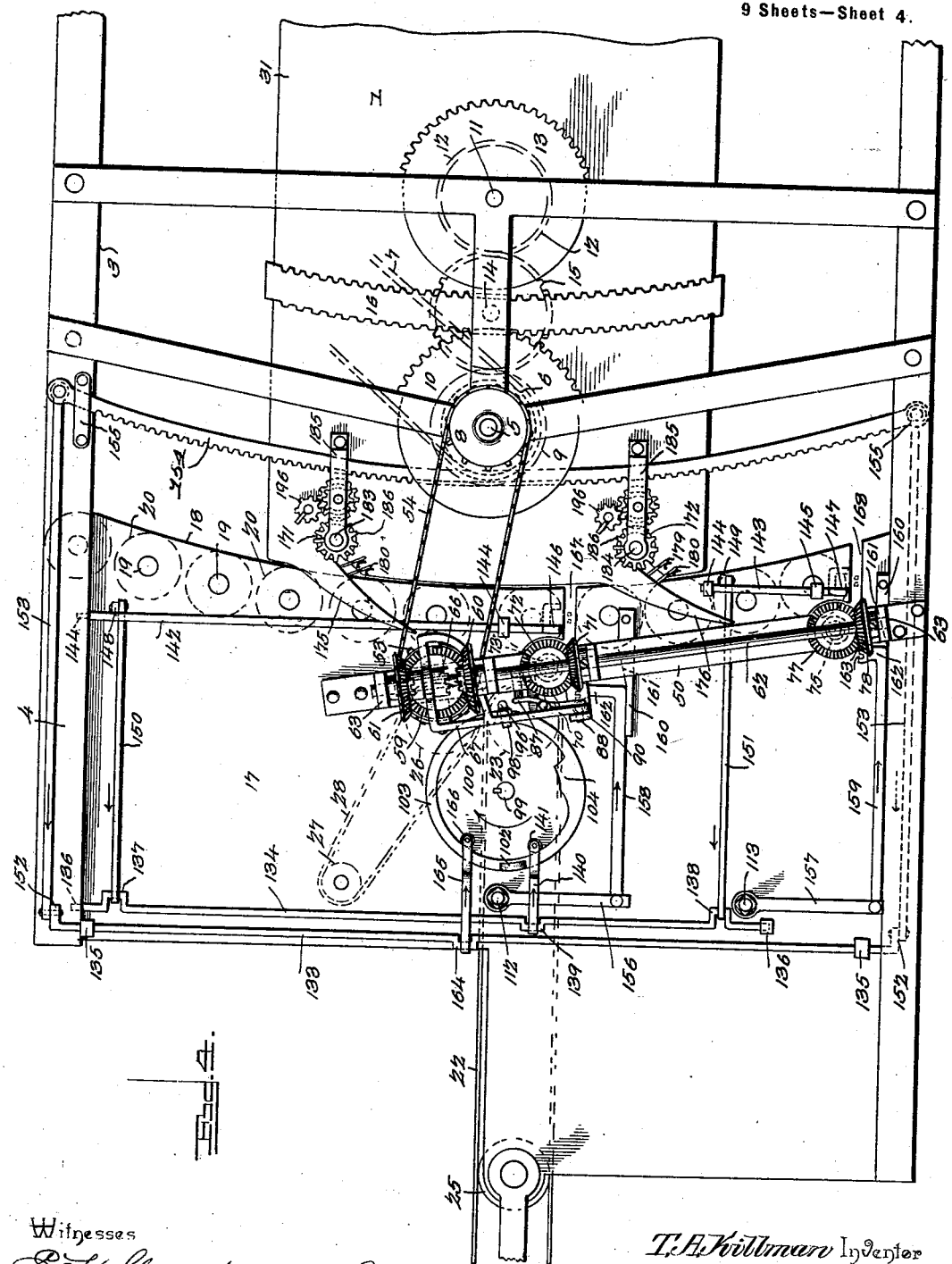

No. 668,736.  
T. A. KILLMAN.  
BALING PRESS.  
(Application filed May 7, 1900.)  
Patented Feb. 26, 1901.
(No Model.)
9 Sheets—Sheet 5.
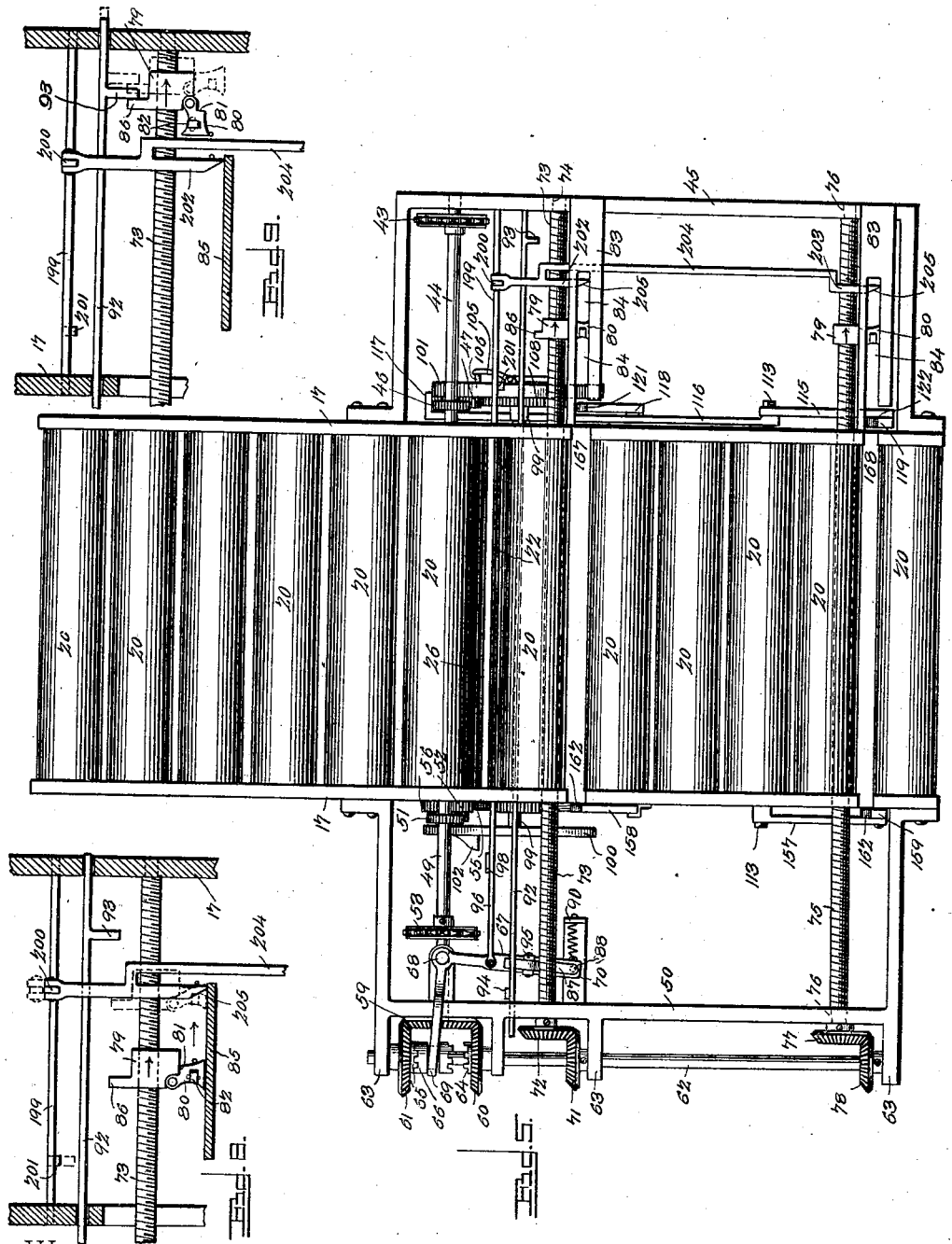
Witnesses  
T. A. Killman, Inventor  
By his Attorneys,

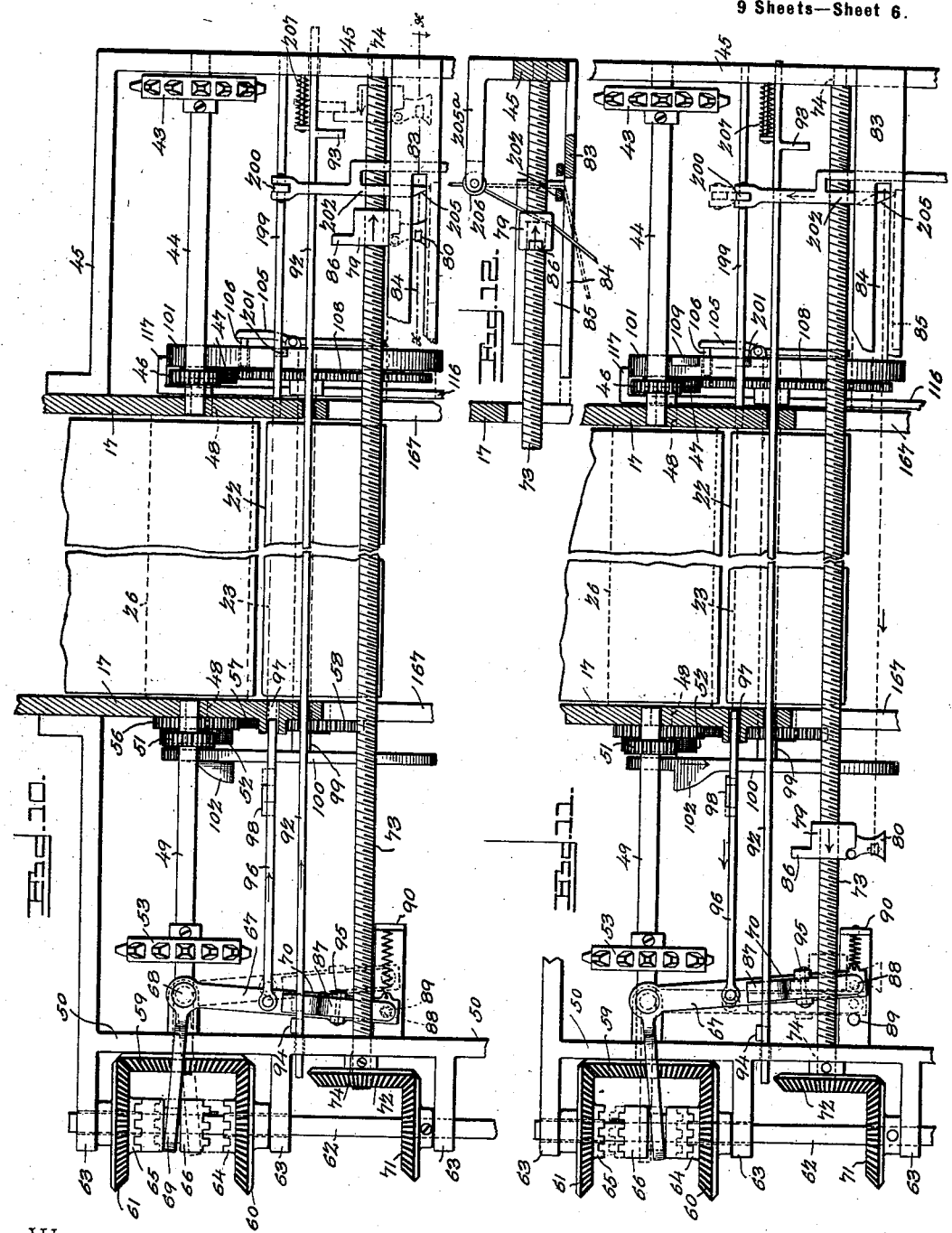

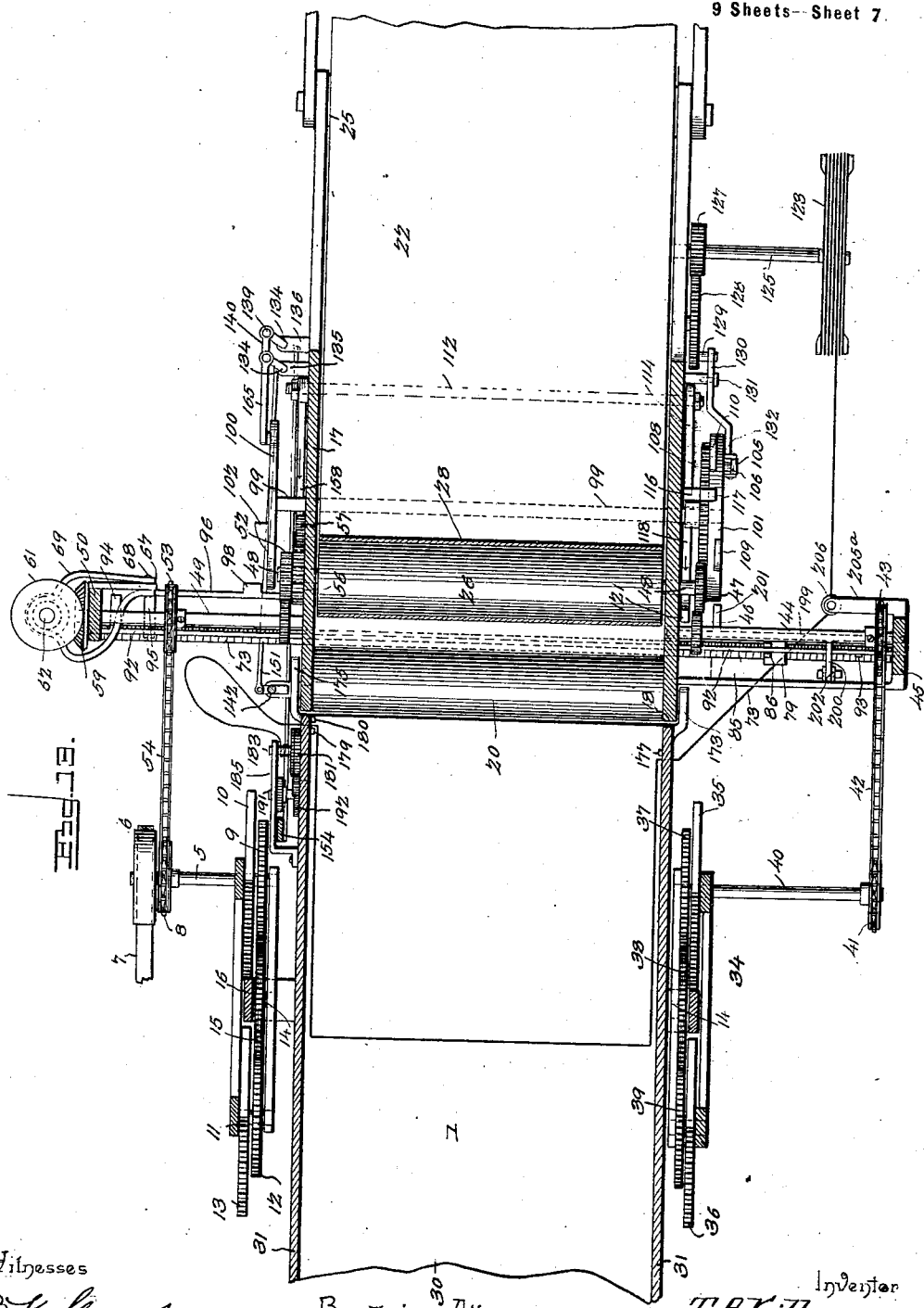

No. 668,736. Patented Feb. 26, 1901.
T. A. KILLMAN.
BALING PRESS.
(Application filed May 7, 1900.)
(No Model.) 9 Sheets—Sheet 8.
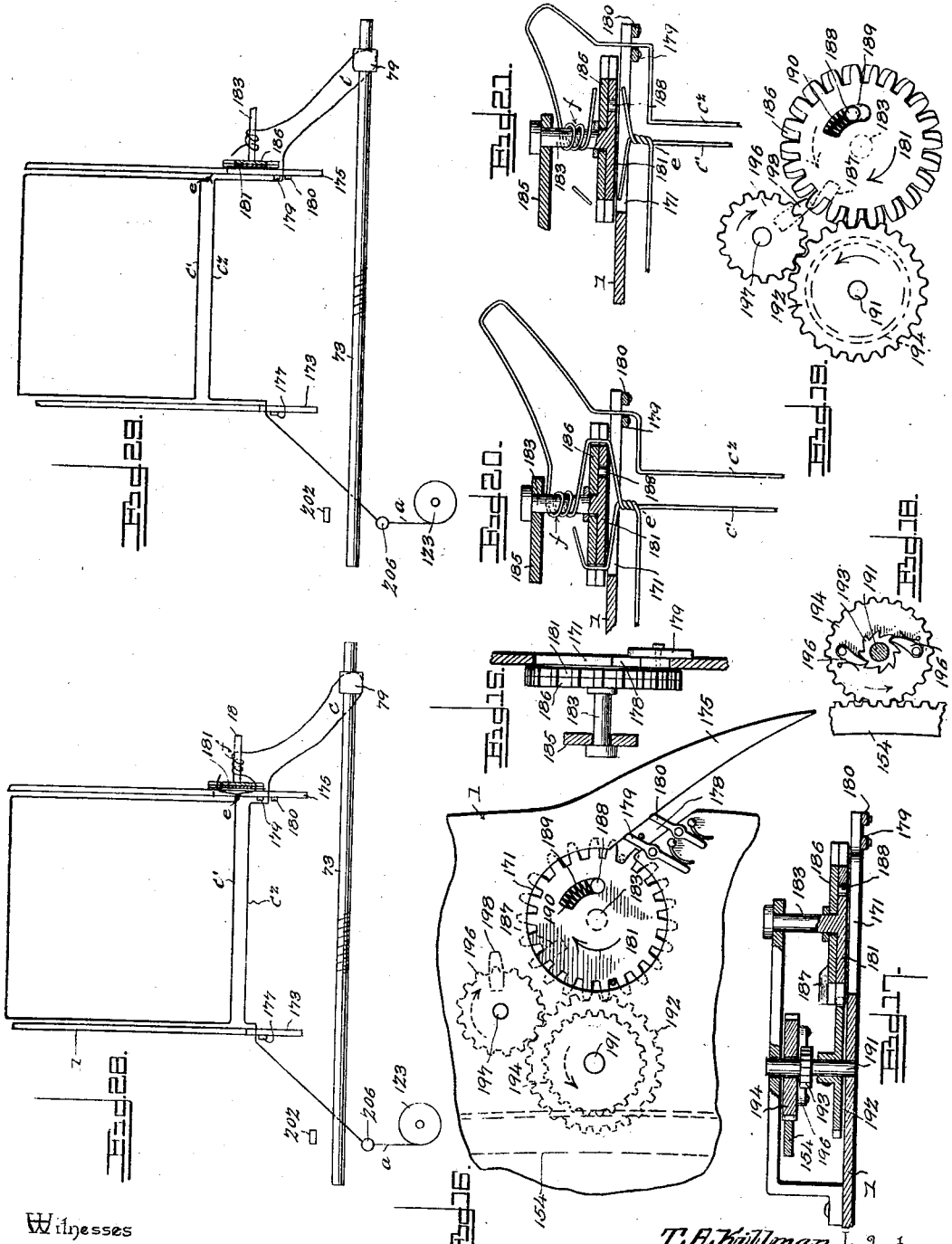

No. 668,736. Patented Feb. 26, 1901.
T. A. KILLMAN.
BALING PRESS.
(Application filed May 7, 1900.)
(No Model.) 9 Sheets—Sheet 9.
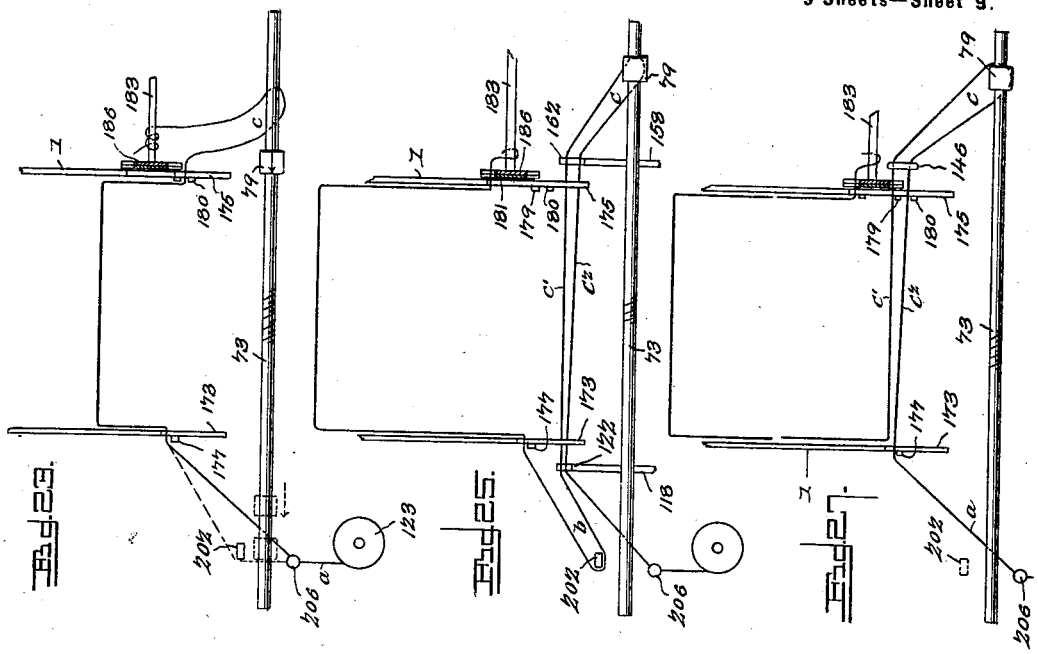
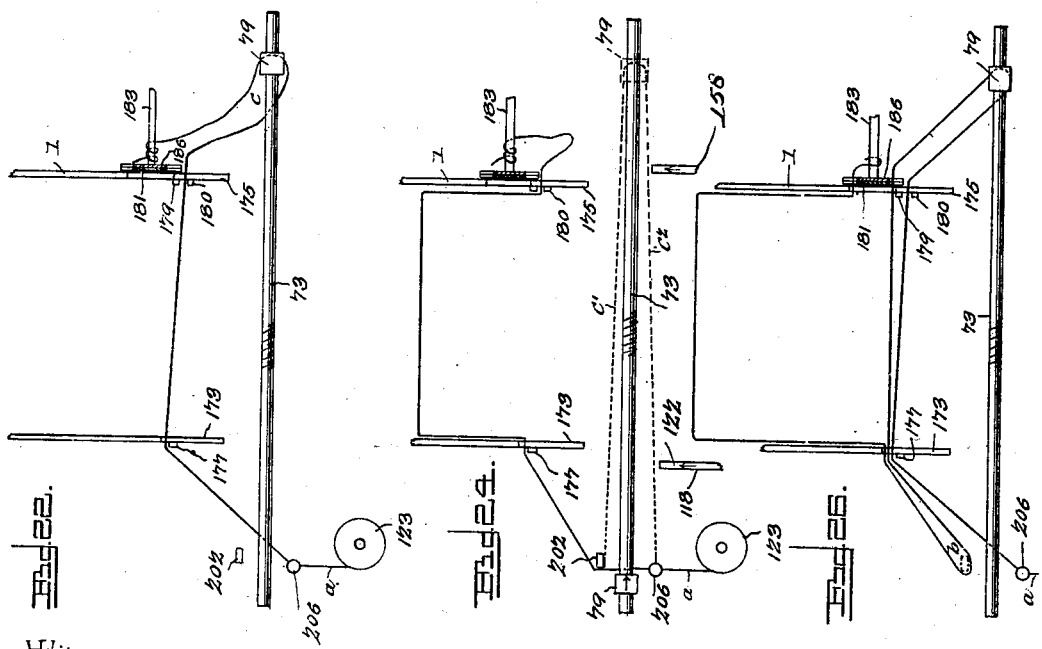

UNITED STATES PATENT OFFICE.

THOMAS A. KILLMAN, OF LIBERTY, TENNESSEE.

BALING-PRESS.

SPECIFICATION forming part of Letters Patent No. 668,736, dated February 26, 1901.

Application filed May 7, 1900. Serial No. 15,773. (No model.)

*To all whom it may concern:*

Be it known that I, THOMAS A. KILLMAN, a citizen of the United States, residing at Liberty, in the county of Dekalb and State of Tennessee, have invented a new and useful Baling-Press, of which the following is a specification.

My invention is an improved baling-press for baling hay and the like, the object of my invention being to provide a press which is efficient in forming the bales, placing the tie-wires around the same, knotting the ends of the tie-wires, severing the same, and ejecting the completed bales and which is automatic in the performance of its various functions and of maximum capacity.

My invention consists in the peculiar construction and combination of devices hereinafter fully set forth, and pointed out in the claims.

In the accompanying drawings, Figure 1 is a perspective view of a baling-press embodying my improvements. Fig. 2 is a vertical longitudinal central sectional view of the operating or front portion of the press. Fig. 3 is a side elevation of the same. Fig. 4 is a similar view of the opposite side of the press. Fig. 5 is a vertical transverse sectional view of the same looking in the direction indicated by the arrow in Fig. 2. Fig. 6 is a detail elevation of the cam for actuating the reel-releasing mechanism and the push-bars for moving the wires into the paths of the engaging hooks of the press-box, a portion of the cam-plate being broken away to disclose the subjacent gear-wheel. Fig. 7 is a detail view of the same at right angles to Fig. 6, partly in section. Figs. 8 and 9 are detail views of the screw-shaft, the wire-carrier, the keeper, and their connections, illustrating the operation of the carrier and keeper in causing a wire to be engaged by the keeper at one end of the stroke of the carrier. Figs. 10 and 11 are detail transverse sectional views on an enlarged scale. Fig. 12 is a detail top plan view, partly in section, on the line *x x* of Fig. 10. Fig. 13 is a horizontal longitudinal sectional view on a plane indicated by the line *y y* of Fig. 2. Fig. 14 is a detail sectional view on the line *z z* of Fig. 1. Figs. 15, 16, 17, 18, 19, 20, and 21 are detail views of the wire twisting and cutting devices. Figs. 22, 23, 24, 25, 26, 27, 28, and 29 are diagrams illustrating the operation of the devices for tying the bales and cutting the wires. Figs. 30 and 31 are detail views.

The press-box 1, which is oblong in form and rectangular in cross-section, is pivoted at one end, as at 2, in a supporting-frame 3, and the free inner end or mouth of the press-box is adapted to oscillate in said supporting-frame. The frame 3 has an extension 4, which projects beyond the mouth of the press-box, and a driving-shaft 5 is journaled in suitable bearings on one side of the frame 3 and provided with a power-pulley 6, to which power is applied from a suitable motor by an endless belt 7 in the usual way. On the said shaft 5 are a sprocket-wheel 8 and a gear-wheel 9, and on the said shaft is also keyed a segmental gear-wheel 10. A counter-shaft 11 is also journaled in suitable bearings on the frame 3 and is provided with a spur-wheel 12, which is of the same diameter as the spur-wheel 9, and a segmental gear 13, which is of the same size as the segment-gear 10. A shaft 14 is journaled in suitable bearings in the frame 3 and is arranged intermediate of the shafts 5 11, and on said shaft 14 is an idle spur-wheel 15, which is of the same size as spur-wheels 9 13 and engages said spur-wheels. On the side of the press-box, at the point between the segment-gears 10 13, is secured a segment-rack 16, which is concentric with the pivot of the press-box and is provided with rack-teeth on both of its curved sides, and it will be observed by reference to Fig. 4 that the segment-gears are disposed in reverse relation to the said curved rack-bar, so that they engage the same alternately. It will be understood that inasmuch as the gears 6 15 12 correspond in diameter and the segment-gears are alike in diameter the latter are rotated at the same rate of speed and in unison with each other and that inasmuch as said segment-gears alternately engage the curved rack-bar of the press-box oscillatory motion is imparted to the latter and the same is caused to move down and up at its free end between the sides of the supporting-frame.

The extended front portion of the frame for a suitable distance beyond the free end or mouth of the press-box is provided with vertical side walls 17, in which, near their curved inner sides 18, which are concentric with the pivots of the press-box and against which the front sides of the latter are disposed, are bearings 19, in which are journaled a series of compression-rolls 20, which coact with the oscillating press-box in the formation of a continuous bat of the hay or other material and the disposition of the same in successive layers and compression of said layers in the press-box. It will be observed by reference to the drawings that a suitable space 21 is left between the proximate sides of the pair of compression-rolls which are midway in the series.

An endless feed-apron 22 is horizontally disposed and supported by rollers 23 24 and an intermediate roller 25, (one or more, according to the length of the feed-apron,) the said rollers being journaled in bearings in the side walls 17 and the upper one thereof being disposed in a plane about midway in the opening 21.

A roller 26 is disposed at a suitable distance above the roller 23 and is journaled in bearings in the side walls 17, and said roller 26 is connected to an idle roller 27 by an inclined endless feed-apron 28, which is disposed above the inner end of the feed-apron 22, as shown in Fig. 2. Horizontally-disposed feed-plates 28ª, one above the other, are supported by the side walls 17 between the rollers 23 26 and the opposing rolls 20. Motion being imparted to the feed-aprons 22 28 by the means hereinafter described and said feed-aprons having their operating leads which convey the material traveling toward the mouth of the press-box, the hay or other material is compressed into a continuous bat and fed into the press-box through the opening 21, and by the oscillatory motion of the press-box and the coaction between the mass of material therein and the compression-rolls 20 the said bat is disposed in vertical layers between the sides of the press-box, the coaction between the frictional resistance of the mass of material in the press-box and the immovable compression-rolls, which are rotated by frictional contact with the outer side of the outermost layer of bat in the press-box, serving to compress the bats of material in the press-box to form bales of the required density.

It will be observed by reference to Fig. 1 that the inner end of the upper and lower sides 29 30 of the press-box extend beyond the sides 31 thereof, which determine the length of the chamber in which the bales are formed and tied, as presently described, and that said projecting portions of the upper and lower side of the press-box are resilient and capable, within certain limits, of being adjusted toward each other, so as to decrease the distance between them, and hence correspondingly narrow the discharge inner pivoted end of the press-box, and thereby retard the movement of the bales through the press-box as the material is fed and compressed in the mouth of the baling-chamber, as may be required to secure the requisite density of the bales. Such adjustment of the extended inner ends of the upper and lower side of the press-box may be effected by any suitable means, and I have shown in the drawings (Fig. 1 thereof) bolt-rods 32, which connect said upper and lower sides of the press-box, extend through the upper side thereof, and are provided with compression screw-wheels 33, which may be turned by hand to effect the requisite adjustment, as will be readily understood.

On the side of the press-box opposite the rack-bar 16 is a similar curved rack-bar 34, which is operated by segment-gears 35 36 and connecting-gears 37 38 39, between said segment-gears, in the same manner as the bar 16, previously described herein. The shaft 40, which carries the segment-gear 35, has a sprocket-wheel 41, which is keyed thereon and is connected by an endless sprocket-chain 42 with a sprocket-wheel 43 on a shaft 44, which is journaled at its outer end in a frame 45, that projects laterally from one side of the frame 3, the inner end of said shaft being journaled in a bearing in one of the side walls 17. On said shaft is keyed a pinion 46, which engages a pinion 47 on one end of the shaft 48 of the roller 26, and thereby rotary motion is communicated from said roller 26 to the said shaft 40, and hence through the train of gears last above described power is applied to the segment-bar 34, and thereby both sides of the press-box are positively impelled to produce oscillatory motion.

A shaft 49 is disposed in the same plane and in line with the shaft 44 and the side of the press opposite said shaft 44, said shaft 49 being journaled at its outer end in a bearing in a frame 50, which is identical, or practically so, with the frame 45, the inner end of said shaft 49 being journaled in one of the side walls 17 and geared to the roller 26 by pinions 51 52, with which said shaft and roller are respectively provided. A sprocket-wheel 53 is fast on the shaft 49 and is connected by the endless sprocket-chain 54 with the sprocket-wheel 8 on shaft 5. It will be understood from the foregoing and by reference to the drawings that the shafts 44 49 are caused to rotate in unison.

The roller 26 is provided at one end with a gear-wheel 55, which engages an idle wheel 56, which in turn engages an idle wheel 57, which meshes with a gear 58 on the shaft of the roller 23. Hence said roller 23 and roller 26 are rotated in the direction indicated by the arrows in Fig. 2 and motion is imparted to the feed-aprons.

On the outer end of the shaft 49 is keyed a miter gear-wheel 59, which is engaged by horizontally-disposed miter-gears 60 61, which are loose on a vertical shaft 62, said shaft being journaled at its upper and lower end and at intermediate points in bearings 63, with which the frame 50 is provided. The said gear-wheels 60 61 are respectively provided on their opposing inner sides with clutch members 64 65. A clutch 66 is splined on the shaft 62 between said wheels 60 61 and is adapted to alternately engage said wheels so as to lock either of them to said shaft 62, and thereby cause said shaft 62 to be rotated either in one direction or the other, as will be understood. A bell-crank lever 67 is suitably mounted, as at 68, and has an arm 69, which engages the clutch 65, and has also a depending arm 70. A beveled gear-wheel 71 is fast on the shaft 62 and engages a similar wheel 72, which is fast on one end of a horizontally-disposed screw-shaft 73, the latter being journaled in bearings 74 in the frames 45 50 and extending transversely through openings in the side walls 17. A similar screw-shaft 75 is journaled in bearings 76 near the lower sides of the frames 45 50 and is connected to the shaft 62 by miter-gears 77 78. It will be understood that when the bell-crank lever is removed, so as to cause the clutch 65 to engage the gear 61, the screw-shafts will be rotated in one direction, and that when said bell-crank lever causes the said clutch to engage the gear 64 said screw-shafts will be rotated in the reverse direction. On each of the said screw-shafts is a traveling block 79, said traveling block having transverse threaded openings which are engaged by the said screw-shafts, and said traveling blocks are adapted to be moved back and forth from end to end of said screw-shafts by the rotation of the latter first in one direction and then in the reverse direction, as will be readily understood. To the lower side of each block 79 is hinged an arm 80, which normally depends therefrom and is provided on one side of its pivotal connection with the block with a stop-shoulder 81, adapted to engage the bottom of the block, and thereby said arm is free to swing or turn in one direction only. In said arm, in one side thereof, is mounted an antifriction roller or sheave 82, which engages the baling-wire, as presently appears.

Horizontally-disposed arms 83 are supported by the frame 45 slightly below the planes in which the screw-shafts are disposed and parallel with said screw-shafts, said arms extending inwardly toward the opposing side wall 17, and each of said arms has a longitudinal slot 84, which is open at its inner end. Said arms 83 are each provided at the lower side with a laterally-extending horizontally-disposed plane 85, of suitable length, and when the blocks 79 in traversing the screw-shafts approach the vertically-disposed outer portion of frame 45 the lower side of the hinged depending arms 80 of said blocks ride upon the said planes, the latter serving to prevent the said hinged arms from swinging inward from said blocks toward the longitudinal axis of the machine, as will be understood by reference to Fig. 8, and said arms 80 are thus maintained by the said planes until the said arms by the continued movements of said blocks clear the outer ends of said planes farthest from the longitudinal axis of the machine. Each traveling block 79 has on its upper side a vertically-extending tappet-arm 86. A bell-crank lever 67 is provided with a pivoted latch 87, which carries at its lower end a pin 88, which when the said bell-crank lever is in the initial position shown in Fig. 10 is held in engagement with an opening 89 in a horizontally-disposed arm 90, which projects from and is supported by the frame 50. A spring 91 serves to keep said pin 88 normally in engagement with said opening. At a suitable distance above the upper screw-shaft 73 is a shifting rod 92, which is supported in openings in the frames 45 50 and in the side walls 17, as shown in Figs. 10 and 11, and said shifting rod is provided near one end with a tappet 93, which is adapted to be engaged by the tappet 79 when the block or screw-shaft 73 nears the vertically-disposed outer portion of frame 45 at one end of said screw-shaft, and said shifting rod is provided near its opposite end with a horizontally-disposed tappet 94, which forms a cam and is adapted to engage the spring-pressed latch 87 and trip the same, so as to disengage the pin 88 from the opening 89, and thereby unlock the bell-crank lever 67, as presently described, the said spring-pressed latch being in the path of said tappet. Said bell-crank lever is provided with a laterally-extending tappet 95, which projects in the path of the block 79 on screw-shaft 73 and is adapted to be engaged by said block as the latter approaches the end of said screw-shaft, which is journaled in frame 50, so that said coacting block and tappet will move said bell-crank lever to the initial position. (Shown in Fig. 10.) An endwise-movable shifting rod 96 is attached at its outer end to the bell-crank lever 67, the inner end of said rod being supported in an opening 97 in the opposing side walls 17, and said rod 96 is provided with a tappet 98.

A cam-shaft 99 is journaled in bearings in the side walls 17 and is disposed between the upper and lower leads of the feed-aprons 22, as shown in Fig. 2, and secured on the ends of said shaft are cam-disks 100 101. The cam-disk 100 is provided with a laterally-projecting cam 102, which is adapted to engage the tappet 98 on rod 96, and said cam-disk is provided on one side with an annular concentric engaging flange 103 and a cam 104, which extends inwardly from said flange.

The cam-disk 101 is provided with a spring-pressed arm 105, pivoted thereto and disposed on the outer face of said cam, said spring-pressed arm having a projecting pin or stud 106 in an opening in said cam-disk and adapted to be engaged with either of a concentrically-disposed series of openings 107, with which a spur-wheel 108, which is loose on the cam-shaft 99 and bears against the inner face of said cam-disk 101, is provided. Said stud and said openings serve to lock the cam-disk to said spur-wheel 108. Said cam-disk is further provided with peripheral cams 109 110. The spur-wheel 108 is engaged by a spur-gear 47 on the roller-shaft 26 and is in constant rotation when the press is in operation, and when the said spur-wheel 108 has one of its openings 107 engaged by the stud or pin 106 the cam 101 is rotated, and hence the shaft 91 and cam 100 are also rotated, as will be understood; but when said spur-wheel 108 is disengaged by said stud or pin 106 said spur-wheel rotates idly and said cam-shaft and the cam-disk thereon remain at rest.

A pair of rock-shafts 112 113 are journaled in bearings in the side walls 17, as shown, and are provided at one end each with a bell-crank lever 114 115, respectively. Said bell-crank levers have their substantially horizontally disposed arms connected together by a link-rod 116, which has on its upper end a laterally-extended horizontal tappet-arm 117, which rides upon the upper side of the cam-disk 101 and is hence disposed in the path of the cam 110 of said disk. A pair of push-bars 118 119 are connected at their outer ends, respectively, to the depending arms of the bell-crank levers 114 115, said push-bars being guided and supported in suitable guides 120 on one of the sides 17, and said push-bars have their inner ends upturned vertically and provided with push-hooks 121 122, respectively. The parts 118 119 are called "push-bars" because they serve to push the baling-wires into the paths of engaging hooks carried by the press-box, as will presently appear.

A pair of wire-reels 123 124 are mounted and adapted to rotate on spindles 125 126, respectively, which project from one of the side walls 17, and the upper wire-reel 123 is provided with a spur-pinion 127, which is engaged by a spur-gear 128, the latter having a projecting tappet 129 on one side. Said tappet is adapted to engage a spring-pressed lever 130, which is pivoted, as at 113, and has its extended inner arm 132 disposed in the path of the spring-pressed arm 105, which is carried by the disk 101.

On the side of the press-frame opposite the reels are vertically-disposed rock-shafts 133 134, which are journaled in suitable bearings 135 136, respectively. The rock-shaft 134 is provided near its upper and lower ends with cranks 137 138 and with an intermediate crank 139. A link 140 is connected to the crank 139 and is provided at its inner end with a tappet 141, here shown as an antifriction-roller, which bears against the annular flange 103 of the cam-disk 100 and when engaged by the cam 104 serves to partly rotate said rock-shaft 134, as will be understood.

A pair of vertically-disposed rock-shafts 142 143 are journaled in suitable bearings 144 145, respectively, on one of the vertical side walls 17 near one side of the coacting mouth of the press-box, and said rock-shafts are provided, respectively, at their lower ends with hook-arms 146 147, which engage and manipulate the baling-wires, as will presently appear, and are further provided with crank-arms 148 149. A link-rod 150 connects the crank-arm 148 of rock-shaft 142 with the crank 137 of rock-shaft 134, and a similar link-rod 151 connects the crank-arm 149 with the crank 138 of said rock-shaft 134, and it will be understood that when said rock-shaft 134 is partly rotated in the manner hereinbefore described said partial rotation will be communicated to the rock-shafts 142 143.

The rock-shaft 133 is provided at its upper and lower extremities with crank-arms 152, which are connected, by means of rods 153, with the upper and lower ends of a laterally-movable curved rack-bar 154, which is concentric with the pivotal axis of the press-box. Said rack-bar is supported and adapted to slide in guides 155, as shown in Fig. 4. The function of said rack-bar is to impart motion to wire twisters and cutters, as will be presently described.

To the ends of the rock-shafts 112 113 opposite the bell-crank levers 114 115 are secured crank-arms 156 157, respectively. Rods 158 159 are pivotally connected at their outer ends to said crank-arms, the inner ends of said rods being supported on ways 160, which are provided with cam-faces 161, forming inclined planes. Said inner ends of said rods are upturned and provided with wire-carriers 162, each provided in its upper side with a pair of notches 163, adapted to receive a pair of wires, as presently described. It will be understood that when the link-rod 116 is by its tappet 117 and the cam 110 of cam-disk 101 raised the rock-shafts 112 113 are partly rotated, thereby causing the push-bars 118 119 to move inward toward the press-box and also causing the rods 158 159, having the wire-carriers, to also move inward toward the press-box and to ride upward on the cams 161 while doing so, and it will be further understood that when said tappet 117 is cleared by said cam 110 said link-bar 116 will drop by its own gravity and the push-bars and wire-carriers caused to reassume their normal positions. (Shown in Figs. 3 and 4.)

The rock-shaft 133 has a crank 164, to which is connected a link-rod 165, the inner end of which has a tappet 166, which also engages the inner side of the annular flange 103, with which the cam-disk 100 is provided, said tappet, which is here shown as an antifriction-roller, being disposed in the path of and adapted to be engaged and operated by the cam 104, so as to impart rocking motion to said rock-shaft 133, and thereby alternately move the curved rack-bar 154 into and out of engagement with the wire-twisting mechanisms.

Open slots 167 168 are made in appropriate places in the side walls 17, said slots extending to the curved inner edges of said side walls, against which the mouth of the press-box operates, said open slots serving to permit the stringing of the binding-wires from the reels transversely between the said side walls 17 and in position to be caught by the bales as they are successively formed and to be disposed around said bales.

The press-box is provided in its side walls at its mouth with open notches 169 170 and in the opposite side wall with open notches 171 172. Hooks 173 174, which project from one side of the press-box beyond the mouth thereof for a suitable distance, have curved lower sides, which lead to the upper sides of said notches 169 170, and similar hooks 175 176, which project from the opposite side of the press-box, have curved lower sides, which lead to the upper sides of the notches 171 172. In the channels or open slots between the lower side of hooks 173 174 and the lower sides of notches 169 170 are pivoted spring-pressed catches 177, which tend to normally close said channels, and in each of the channels 178, which lead to the openings 171 172, are disposed a pair of pivoted spring-pressed catches 179 180. Spur-wheels 181 182 are disposed on the outer sides of said openings 171 172, respectively, and concentrically therewith and practically cover the same. The inner ends of the notches between the spurs of said wheels are within the radii of said openings, as shown, and said spur-wheels are fast on shafts 183 184, respectively, which shafts are mounted in bearing-brackets 185, secured to the side of the press-box. On the outer side of each of the spur-wheels 181 is a loose spur-wheel 186, which is provided on one side with a tappet 187. Said spur-wheel 186 is provided on its inner side with a projecting stud 188, which rides in a concentric slot 189, with which the wheel 181 is provided. A spring 190 in said slot bears between one end thereof and said stud, and the latter is so located that the spurs of the loose wheel 186 are normally in line with the spurs of the wheel 181. Said wheels 181 186 are wire twisters and cutters, as presently described. A shaft 191 is journaled in bearings in the bracket 185 and the opposing side wall of the press-box, and on the said shaft is a fast spur-wheel 192, which engages the wheel 181. A ratchet-wheel 193 is also fast on said shaft, and a spur-wheel 194, which is adapted to be engaged and rotated by the curved rack-bar 154, owing to the oscillatory motion of the press-box, as hereinbefore described, when said curved rack-bar is moved forward by the means hereinbefore described, is provided with spring-pressed pawls 196, which engage said ratchet-wheels 193, and hence, although the said spur-wheel 194 is rotated first in one direction and then in the opposite direction as the press-box and the curved rack-bar thereon move up and down, the said shaft 191, gear-wheel 192, and gear 186 are only rotated in one direction and remain idle when the said spur-wheel 194 is rotating idly on said shaft 191. A pinion 196ª, which is mounted on a suitable stud 197, that projects from the side of the press-box, engages the spur-wheel 192 and is provided with a projecting tappet 198, which is so constructed as to be adapted to be engaged by the tappet or lug 187 of wheel 186, the series of gears being so proportioned in size that said tappets will thus come into engagement with each other after a predetermined number of revolutions of the wheel 181 and its shaft 183, and said tappets serve to momentarily reverse the rotation of the wheel 186, which is carried by the wheel 181, as hereinbefore stated, so as to cause the spurs of said wheel 186 to register with the notches between the spurs of wheel 181, and thereby act as shears to cut off a wire disposed transversely across one side of said wheels 181 186 and engaged by coacting spurs thereof. This reverse movement of the wheel 186 with relation to the wheel 181 is permitted by the stud 188, which plays in the slot 189, and the spring 191 as soon as the tappets 187 198 are out of engagement with each other, which follows from the continued rotation of the train of gears, restores said wheel 186 to its initial position relative to said wheel 181. A similar train of gears are provided and used in connection with the wire-twisting wheel 182, and hence the press-box is provided with two complete sets of wire twisting and cutting mechanisms, and as thus provided the press is adapted for placing two wires around each bale which is formed therein. By increasing the number of wire twisting and feeding mechanisms and correspondingly duplicating other parts of the machine hereinbefore described the press may be adapted for placing any desired number of wires around each bale formed therein.

A rock-shaft 199 is journaled in bearings in the frame 45 and the proximate side walls 17, and said rock-shaft is provided with an arm 200 and a tappet-arm 201, the latter being disposed in the path of the cam 109 on the cam-disk 101. Keepers 202 203, which are carried by and depend from the arm 200, are connected together by integral rod 204, and said keepers are disposed near the closed ends of the slots 84 and are provided on their inner sides at their lower ends with the bevels 205. Said beveled ends of said keepers are normally disposed in the same horizontal planes with said slots 84 and are maintained in such position by their own weight at all times, excepting when the cam 109 by the rotation of the cam-disk 101 engages the tappet-arm 201 of rock-shaft 199 and causes the latter to be partially rotated, so as to raise said keepers sufficiently to cause their lower beveled ends to clear said slots 84.

The frame 45 is provided in the planes of the open slots 167 168 with bearings 205ª, in which are journaled cylindrical eye-blocks 206, through which the wires a from the reels are passed.

The operation of my invention is as follows: Before starting the press in motion the wires from the reels are threaded transversely across the mouth of the press-box and attached to the carrier-blocks and twisting and cutting mechanisms in the manner which I will now describe in connection with the wire from one of the reels, both of the wires being threaded alike and the twisting and cutting mechanisms being duplicates of each other and operating in the same manner, as will be understood. The wire from the upper reel is passed through the appropriate eye 206, from thence through the opening 169 in one side of the press-box, and thence transversely across the mouth of the press-box through the open channel 171. A bight or loop is then formed in the wire by passing the same around the outer side of the depending arm of the carrier-block 79 and in engagement with the antifriction-sheave 82, the end of the wire being twisted in several loops around the shaft 183 and the wire in the open channel or slot 171 being disposed between the spring-pressed catches 179 180 and the wires in the opening 169 being maintained therein by the spring-pressed catch 177, this initial position of the wire being indicated in the diagram Fig. 22. The press being started in operation, the material is compressed in the press-box in the manner hereinbefore described, and as the bale is being formed the wire stretched across the mouth of the press-box is carried inward thereby, and hence becomes disposed upon three sides of the bale, as will be readily understood. The bight or loop previously formed in the wire renders the same slack, and thus adapts it to yield and encompass the bale as the same is being formed. It will be understood that owing to the oscillatory motion of the press-box the bight or loop formed in the wire drops from the pivoted depending arm of the carrier-block 79. The initial position of the bell-crank lever 67 is shown in Fig. 10, in which position the clutch 66 is in engagement with the clutch member of the miter gear-wheel 61, the result being that the screw-shaft 73 is rotated in such direction as to cause the carrier-block 79 to move in the direction indicated by the arrow on said carrier-block in said figure. The loop c forms one half of the wire that encompasses the bale, the other half being fed from the wire-reel while the bale is being formed. During the formation of one bale the carrier-block 79 travels from its initial position near the vertical portion of frame 50 the entire length of the screw-shaft 73. The wire-reel pays out the wire as the same is needed, and that portion of the wire between the eye 206 and the open notch 169 becomes taut and disposed in the path of the hook 173, said wire being retained in said open notch 169 by the spring-pressed catch 177. As the carrier-block 79 nears the open slot 84 in the arm 83 its depending pivoted arm 80 engages that portion of said wire between the eye 206 and hook 173 just prior to reaching the plane 85 with which said arm is provided, and when the said pivoted depending arm 80 of said carrier-block 79 reaches and begins to ride over said plane 85 after having contacted with the wire said plane, as hereinbefore described, prevents said pivoted depending arm from turning on its pivot, and hence while said pivoted arm is passing over said plane it necessarily carries said wire with it to the end of the plane. It will be observed by reference to Fig. 12 of the drawings that the keeper 202 is disposed transversely across the open slot 84, near the inner end of the latter and one end of the plane 85, and that the beveled lower side of the keeper 202 is disposed toward the block 79, which passes on the inner side of said keeper and just clears the same, the result being that the pivoted depending arm of the carrier-block and the plane 85 coact to cause the wire carried by said arm to strike and be drawn across the beveled or inclined lower side of said keeper, thereby raising the latter and causing the wire to slip under it, and as soon as the wire reaches the outer side of the keeper the latter by its own gravity drops on the inner side of the wire, and hence the latter is disposed beyond the said keeper, as will be understood and as illustrated by the dotted lines in diagram Fig. 23. Immediately after the wire is thus disposed on the outer side of the keeper the pivoted arm 80 of the carrier-block clears the outer end of the plane 85, and hence as the carrier-block continues to move in the same direction toward the frame 45 and nears one end of the screw-shaft 73 the said pivoted arm 80, being yet in engagement with the wire, is by its pressure against the wire caused to turn to one side, as shown in Fig. 9, and ride over and clear the wire, when it immediately by gravity reassumes its initial vertical position hereinbefore stated and as shown in dotted lines in said Fig. 9. As the block 79 thus nears one limit of its stroke and clears the wire its tappet-arm 86 comes in engagement with the tappet 93 of the spring-pressed shifting rod 92 and moves the latter in one direction against the tension of the spring 207 and causes the tappet or cam 94, near the other end of said shifting rod, to engage the spring-pressed catch 87 of the bell-crank lever 67 and depress the upper end of said catch, so as to release the stop pin or stud 88 thereof from the opening 89 of arm 90, thereby unlocking said bell-crank lever from its initial position, whereupon the clutch 66 by its gravity descends on the vertical shaft 62, turning the bell-crank lever partially on its pivot until said clutch 66 clears and disengages the clutch member 65 of miter-wheel 61, and hence said shaft 62 and consequently the screw-shaft 73 are caused to momentarily cease to rotate, and the block 79 stops when it reaches the position shown in dotted lines in Fig. 10. The cessation of rotation of the shaft 62 and screw-shaft 73 is only momentary, and as the clutch 66 continues to descend it engages the clutch member 64 of the miter-wheel 60, thereby again causing shafts 62 and screw-shaft 73 to again rotate, but in a reverse direction, and hence causing the carrier-block to move in the reverse direction and approach the frame 50 on the opposite side of the machine. The position of the carrier-block 79 with reference to the wire $a$ when said carrier-block is at the limit of its stroke near the frame 45 and one end of the screw-shaft is illustrated diagrammatically in Fig. 24 in solid lines, said carrier-block being disposed on the outer side of that portion of the wire between the keeper 202 and the eye 206, the pivoted depending arm 80 of said carrier-block having swung to one side and ridden over said wire and dropped beyond it, and hence as the motion of said carrier-block is reversed, as hereinbefore stated, said carrier-block in crossing the plane of the longitudinal axis of the press-box carries the wire with it, forming a bight or loop therein, as shown by the dotted lines in diagram Fig. 24, the reel paying off wire while said carrier-block is traversing the screw-shaft and disposing the two sides of the bight or loop of the wire transversely across the press and in position to be introduced or carried within the paths of the hooks 173 175 by the means hereinafter described. As the carrier-block 79 approaches the frame 50 it engages the tappet 95 of the bell-crank lever 67 and moves said bell-crank lever with it, thereby raising the clutch 66 sufficiently to disengage the latter from the clutch member 64 of the miter gear-wheel 60, and hence causing shafts 62, shaft 49, and screw-shaft 73 to again cease to rotate and the said block 79 to stop. The block 79, screw-shaft 73, and clutch 66 remain at rest until the bale is completed and the tying device set in motion, as presently described. The spur-wheel 108 is in constant rotation at all times during the operation of the press, as before stated; but when the block 79, screw-shaft 73, and clutch 66 are at rest the shaft 99, on which are the cam-disks 100 101 and which is geared to shaft 49, is also at rest, said shaft 99, and hence the cam-disks 100 101, being in rotation only at such times as the cam 101 is locked to the spur-wheel 108 by the engagement of the pin or stud 106 with one of the openings 107. Normally the spring-pressed arm 105 is by the lever 130 bearing upon its longer arm held in the position shown in Fig. 7, with the stud or pin 106 out of engagement with the spur-wheel 108, and while the said lever 130 is in this position it is clear of the stud 129 of gear 128 and the latter is being rotated by the gear 127, which turns with the reel 123, the latter being turned by the paying off of the wire caused by the motion of the press-box and the formation of the bale therein. When the bale is completely pressed, the pin 129 comes into engagement with lever 130 by the turning of the wheel 128, the mechanism being so timed and the gears so proportioned that the wheel 128 makes one revolution during the operation of forming a single bale in the press-box. The final stage of the pressing of the bale is reached at the instant that the block 79, screw-shaft 73, and clutch 66, the shaft 99, and cam-disks 100 101 cease momentarily to operate, as hereinbefore stated, the wire having been disposed on the outer side of the pressed bale and doubled and threaded across the machine, ready for the formation of another bale. At this point in the operation of the press the tappet or pin 129 disengages the lever 130 from the arm 105, thereby causing the said spring-pressed arm 105 to engage the stud 106 with one of the openings 107 of the gear 108, thereby locking the cam-disk 101 to said gear, and hence causing said cam-disk 101, together with the shaft 99 and cam-disk 100, to make one revolution. At this instant cam 110 of cam-disk 101 by engaging the tappet 117 of link-rod 116, through the medium of the bell-crank lever 114, rock-shaft 112, and arm 116, causes the push-rod 118 to engage its hook with the two sides of the wire and the rod 158 to engage its wire-carrier 162 with said wires, said push-rod and said rod 158 being moved inward by the partial rotation of the rock-shaft 112 and carrying the sides of the wire laterally in the slots 167 into the paths of the hooks 173 175, carried by the press-box, said hooks on a downward stroke of the press-box forcing said wires into the open notch 169 in one side of the press-box and through the channel 178 past the spring-pressed catch 180, one side of the wire being carried also past the catch 179 and into engagement with the wheels 181 186. The positions of the wires while being engaged by the hooks of the press-box is illustrated in the diagram Fig. 25. Thereupon the tappet 109 of cam-disk 101 engages the arm 201 of rock-shaft 199 and partially rotates said rock-shaft, causing the same to elevate the keeper 202 and clear the latter of the wire, thereby leaving the latter slack, as will be readily understood, said keeper immediately after it clears the wire redescending as said cam 109 clears said arm or tappet 201.

It will be observed by reference to Fig. 16 that the upper end of the channel 178 is below the pivotal or axial center of the wheels 181 186, and hence it will be understood that the wire which was threaded in the position shown in the diagram Fig. 22 will have been caused by the formation of the bale and the corresponding recession of the wire in the mouth of the press-box to slip past the inner spring-pressed catch 179 and enter the notches between the spurs of the wheels 181 186 which were coincident with the inner upper end of said channel 178, and thereby become engaged with said wheels, and it will be further understood that as the wire is tightened by the formation of the bale and moved inward in the press-box, it being below the axis of said wheels 181 186, the latter are turned through substantially half a revolution, thereby disposing said wire on the side of the opening and on the sides of said wheels opposite the inner ends of said channel 178, as shown in Fig. 16 and represented diagrammatically in Fig. 25, and hence the sides of the bight $c$ of the wire as they are forced by the wire-carriers 162 into said channel 178, one of them past both the spring-pressed catches 179 180 and into engagement with the wheels 181 and 186 and the other being disposed between said catches 179 180 are so arranged that the side $c'$ of said bight will cover or extend across the outer side of a bale just formed, while the other wire $c^2$ of said bight and which is between said spring-pressed catches will be disposed in the initial position shown in diagram Fig. 22 prior to the formation of another bale. As the cam 110 of the cam-disk 101 clears the tappet 117 of the link-rod 116 the latter drops by gravity, causing the rock-shaft 113 to reassume its normal position, and the push-bar 118 and rod 158 recede and disengage their respective hook and wire-carrier from said wires $c'$ $c^2$, and the keeper 202 having, as previously described, been disengaged from the bight $b$ of the wire the latter is momentarily slack. This step in the operation of wiring the bale is shown diagrammatically in Fig. 26. At the instant that the bight $b$ is released by the keeper 202 the cam 104 of cam-disk 100 engages the tappet 141 of the link 140, thereby partly rotating the rock-shaft 134, and hence partly rotating the rock-shaft 142, through the connections hereinbefore described, thus sweeping the arm 146, which forms a hook at the lower end of said rock-shaft 142, through a quarter of a circle and disposing the same in the path of and above the said wires $c'$ $c^2$, so that upon the ensuing upstroke of the press-box said wires will be caught by said arm or hook 146 and the slack in the wire $c'$ formed by the loosened or released bight $b$ taken up, as illustrated diagrammatically in Fig. 27. Said hook-arm 146 of said rock-shaft 142 is immediately returned to its normal position clear of said wires as said cam 104 clears the tappet 141, whereupon said cam 104 immediately thereafter engages tappet 166, thereby actuating link 165 and rock-shaft 133 and causing the latter through the connections hereinbefore described to bring the curved rack-bar into engagement with the gear-wheel 195, the press-box at this instant being at the upper limit of one of its strokes, and on the ensuing downstroke thereof through the medium of said rack-bar 154 and said gear-wheel 195 said wheels 181 186 are rotated a number of times, thereby twisting the wires carried by said wheels together and uniting them at one corner of the bale, as at $e$, Figs. 20 and 21, thereby securing the wire around the bale, as will be readily understood. Said rotations of said wheels 181 183 also cause said wires to be twisted around the shaft 183, as at $f$, Figs. 20 and 21, and as illustrated in the diagram Fig. 28, and after said wheels 181 183 have made a certain predetermined number of revolutions the tappet 198 of wheel 196, as before described, engages the tappet 187 of wheel 186 momentarily, thereby reversing the rotation of the latter in the manner before described, the coaction of the wheel 181 and the arrested wheel 186 being such as to cause the spurs of said wheels which are in engagement with said wires to act as shears as they pass each other and cut said wires, as illustrated in Fig. 21, thereby separating that portion of the wire around the finished bale from that portion of the wire which is twisted about the shaft 183, has its bight $c$ engaged by the carrier-block 79, is disposed between the spring-pressed catches 179 180, and is stretched across the mouth of the press-box and attached to the reel, as illustrated diagrammatically in Fig. 29. The curved rack-bar 154 is in engagement with the train of gears which twist and cut the baling-wires and actuates the same only while the cam 104 of the cam-disk 100 is in engagement with the tappet 166, said curved rack-bar 154 moving out of engagement with said train of twisting and cutting gear-wheels as soon as said cam clears said tappet, as will be readily understood, and such rotation of the wire twisting and cutting wheels is accomplished while, as before stated, the screw-shaft 73 is at rest by the engagement by the wire-carrier block 79 with the tappet 95 of the bell-crank lever 67 and the clutch 66 disengaged both with the wheel 60 and wheel 61. At the instant, however, that the operation of twisting the wires together and cutting the same, so as to free the finished bale, is completed the cam 102 of the cam-disk 100 engages the tappet 98 of the endwise-movable rod 96, thereby moving the latter outwardly in the direction indicated by the arrow in Fig. 11, and hence causing the bell-crank lever 67 to be restored to its initial position, (shown in Fig. 10,) with the stud 88 in engagement with the opening 89 and reëngaging the clutch 66 with the clutch member 65 of the wheel 61, and hence causing the operation of the machine hereinbefore described to be repeated indefinitely.

It will be understood that in the event that one downstroke of the press-box is not sufficient to cause the wire-twisting wheels to complete the operation of twisting the wires together and cutting of the wire on the finished bale the said wire-twisting wheels remain idle during the ensuing upstroke of the press-box by means of the pawls 196 and ratchet-wheel 193, the operation of twisting and cutting the wire being completed on the ensuing downstroke of the press-box.

It will be understood that one threading of the wire manually is all that is necessary until the wire carried by the reel is exhausted.

Bars $x$, which are disposed parallel with the screw-shafts, bear against the carriers 79 and prevent the latter from turning on said screw-shafts.

Having thus described my invention, I claim—

1. In a baling-press having a feed-opening, the combination of a series of compressing-rolls in fixed bearings and disposed on opposite sides of the feed-opening, means to form and conduct a bat to said feed-opening, a movable baling-press box having a mouth at one end and movable across the series of the compressing-rolls, said press-box coacting with said compressing-rolls and having wire engaging and twisting devices, and means to dispose a wire across the mouth of the press-box, to form bights therein on opposite sides of the press-box, and move said wire into the paths of the wire-engaging devices, substantially as described.

2. The combination with a movable press-box having wire engaging and twisting devices, and a series of compressing-rolls in fixed bearings, said press-box coacting with said rolls, of means to dispose a wire across the mouth of the press-box, to form bights therein on opposite sides of the press-box and move said wire into the paths of the wire-engaging devices, substantially as described.

3. The combination of a baling-press box, wire twisting and cutting devices, means to dispose a baling-wire across said press-box and engage the same with said twisting and cutting devices, a reel for the wire, and stop mechanism for the wire twisting and cutting devices, operated by the reel, substantially as described.

4. In a baling-press, the combination of a press-box having a circular opening in one of its sides and a channel leading to said opening, a plurality of revoluble wire gripping, twisting and cutting gears having coacting peripheral shearing-spurs and a common axis, said gears being disposed on one side of said opening, and having the inner ends of their spurs within the radius of said opening, connections, including a spring, to cause said gears to rotate in unison, means to conduct wires through said channel to said peripheral spurs of said gears, and means to momentarily move the spurs of one of said gears across the spaces between the spurs of the other gear, for the purpose set forth, substantially as described.

5. The combination of a plurality of revoluble wire gripping, twisting and cutting gears having coacting peripheral shearing-spurs and a common axis, connections, including a spring, to cause said gears to rotate in unison, means to dispose wires on opposite sides of the peripheries of said gears, and means to momentarily move the spurs of one of said gears across the spaces between the spurs of the other gear and thereby shear a wire disposed between their respective spurs, substantially as described.

6. In a baling-press, a movable press-box having wire-channels in the sides of its mouth and projecting hooks, in combination with means to dispose the baling-wire within the paths of the hooks, whereby the latter will engage said wire and induct the same into the wire-channels, substantially as described.

7. In a baling-press, a movable press-box having wire-channels in the sides of its mouth and projecting wire-engaging hooks, and catches to retain the wires in said channels, in combination with means to dispose a wire in the paths of said engaging hooks, substantially as described.

8. In a baling-press, a movable press-box having wire-channels in the sides of its mouth, spring-pressed catches to retain a wire in said channels and projecting hooks adapted to induct a wire to said channels, in combination with means to dispose a wire in the paths of said engaging hooks, substantially as described.

9. In combination with a pair of revoluble wire gripping and twisting gears, a stop projecting from one of said gears and operating in a concentric opening in the other, and a spring in said opening engaging said stop, for the purpose set forth, and means for rotating said gears in opposition to each other, substantially as described.

10. The combination of a pair of revoluble wire gripping and twisting gears having coacting peripheral spurs, and a common axis, connections, including a spring to cause said gears to rotate in unison, one of said gears having a spur on one side thereof, a power-gear engaging one of said wire gripping and twisting gears, and an idle gear, engaging said power-gear and having a spur on one side adapted to engage the side spur of one of the pair of wire gripping and twisting gears, substantially as described.

11. The combination of a pair of revoluble wire gripping and twisting gears having coacting peripheral spurs, a shaft projecting laterally from the center of and fast to one of the said gears, the other being loose thereon, connections, including a spring, to cause said gears to rotate in unison, said loose gear having a spur on one side, a power-gear engaging the fast gear, and an idle gear engaging said power-gear and having a side spur to engage that of the loose gear, whereby the rotation of the latter with the fast gear will be momentarily stopped and reversed, for the purpose set forth, substantially as described.

12. In a baling-press, a movable press-box having wire-channels in the sides of its mouth and projecting wire-engaging hooks, means to dispose a wire in the paths of said engaging hooks, revoluble gripping and twisting gears, idle gears, engaging therewith, a rack to engage said idle gears and means to move said rack into and out of engagement with said idle gears, for the purpose set forth, substantially as described.

13. In combination with a movable press-box having wire-channels on opposite sides of its mouth, projecting wire-engaging hooks, wire twisting and cutting devices and catches in said wire-channels, means to dispose a wire into the paths of the wire-engaging hooks and means to form bights in said wire on opposite sides of the press-box, substantially as described.

14. In a baling-press, the combination with a press-box and a wire-twister, of a wire-carrier, means to actuate the same, and a keeper disposed on the side of the baling-press opposite the twister, said wire-carrier being adapted to dispose a baling-wire across the press-box, and said keeper coacting with said wire-carrier to form loops or bights in said baling-wire on opposite sides of the press-box, substantially as described.

15. In a baling-press, the combination with a press-box and a wire-twister, of a wire-carrier, means to actuate the same, a keeper, disposed on the side of the press-box opposite the twister, said wire-carrier being adapted to dispose a baling-wire across the press-box, and said keeper coacting with said wire-carrier to form a loop or bight in said baling-wire, and a tension device for the baling-wire, substantially as described.

16. In a baling-press, the combination with a press-box and a wire-twister, of a wire-carrier, means to actuate the same, a keeper, disposed on the side of the press-box opposite the twister, said wire-carrier being adapted to dispose a baling-wire across the press-box, and said keeper coacting with said wire-carrier to form a loop or bight in said baling-wire, and a reel to pay out the baling-wire, substantially as described.

17. In a baling-press, the combination with a movable press-box having wire-channels in the sides of its mouth and wire-retaining devices, projecting hooks on said press-box adapted to engage a wire and conduct the same to said wire-channels, a carrier to conduct a wire transversely with relation to and beyond the mouth of the press-box, said carrier engaging said wire at one end of its stroke and disengaging said wire at the other end of its stroke, whereby said carrier forms a bight in said wire on one side of the press-box, a keeper coacting with said carrier to form a bight in the wire on the opposite side of the press-box, and means to move said wire into the paths of said engaging hooks, substantially as described.

18. In a baling-press, the combination with a movable press-box having wire-channels in the sides of its mouth and wire-retaining devices, projecting hooks on said press-box adapted to engage a wire and conduct the same to said wire-channels, a carrier to conduct a wire transversely and with relation to and beyond the mouth of the press-box, said carrier engaging said wire at one end of its stroke and disengaging said wire at the other end of its stroke, whereby said carrier forms a bight in said wire on one side of the press-box, a keeper coacting with said carrier to form a bight in the wire on the opposite side of the press-box, a wire-twisting device on the side of the press-box opposite the keeper, and means to dispose the wire in the paths of said engaging hooks, substantially as described.

19. In a baling-press, the combination with a movable press-box having wire-channels in the sides of its mouth, wire-retaining devices in said channels and projecting wire-engaging hooks, for the purpose set forth, a wire-twisting mechanism on one side of said press-box, a wire-reel, a wire-guide, a carrier to conduct a wire from said guide transversely with relation to and beyond the mouth of the press-box, said carrier engaging said wire at one end of its stroke and disengaging said wire at the other end of its stroke, whereby said carrier forms a bight in said wire on the side of the press-box having the wire-twisting mechanism, a keeper coacting with said carrier to form a bight in the wire on the opposite side of the press-box, and means to move said wire into the paths of the engaging hooks carried by the press, substantially as described.

20. The combination with a reciprocating carrier adapted to engage a wire and form a bight therein as it moves in one direction, a keeper to engage said wire and means to release said keeper from said wire on the completion of the bight formed by the wire-carrier, substantially as described.

21. The combination with a movable press-box having wire engaging and twisting devices, of means to dispose a wire across the mouth of the press-box, to form bights therein on opposite sides of the press-box and move said wire into the paths of the wire-engaging devices, substantially as described.

In testimony that I claim the foregoing as my own I have hereto affixed my signature in the presence of two witnesses.

THOMAS A. KILLMAN.

Witnesses:
T. M. BRIGHT,
W. H. ROBINSON.